(12) United States Patent
Rau

(10) Patent No.: US 6,791,768 B2
(45) Date of Patent: Sep. 14, 2004

(54) ARRANGEMENT FOR SECURING A MOUNT OF AN OPTICAL ELEMENT

(75) Inventor: Johannes Rau, Gerstetten (DE)

(73) Assignee: Carl Zeiss SMT AG (DE)

( * ) Notice: Subject to any disclaimer, the term of this patent is extended or adjusted under 35 U.S.C. 154(b) by 0 days.

(21) Appl. No.: 10/280,484

(22) Filed: Oct. 25, 2002

(65) Prior Publication Data

US 2003/0117724 A1 Jun. 26, 2003

(30) Foreign Application Priority Data

Nov. 20, 2001 (DE) .......................................... 101 56 884

(51) Int. Cl.⁷ ................................................. G02B 7/02
(52) U.S. Cl. ...................................... 359/819; 359/811
(58) Field of Search ................................ 359/814, 824, 359/811, 819, 822, 827

(56) References Cited

U.S. PATENT DOCUMENTS

| | | | | |
|---|---|---|---|---|
| 4,598,989 A | * | 7/1986 | Yamada et al. | 396/103 |
| 4,605,286 A | * | 8/1986 | Sumi | 359/696 |
| 4,639,084 A | * | 1/1987 | Kugioka | 359/824 |
| 5,428,482 A | | 6/1995 | Bruning et al. | 359/827 |
| 5,973,863 A | | 10/1999 | Hatasawa et al. | |
| 6,445,515 B2 | * | 9/2002 | Moennig | 359/814 |

FOREIGN PATENT DOCUMENTS

| | | | |
|---|---|---|---|
| CH | 371906 | 10/1963 | |
| DE | 3406907 A 1 | 10/1984 | |
| DE | 0 964 281 A1 | 12/1999 | |
| DE | 198 25 716 A 1 | 12/1999 | |
| DE | 199 10 947 A 1 | 9/2000 | |
| EP | 0 053 463 A2 | 6/1982 | |
| EP | 0 230 277 A2 | 7/1987 | |
| EP | 0 721 199 B1 | 1/1996 | |
| EP | 1 209 500 A2 | 5/2002 | |
| JP | 63163807 A | * 7/1988 | G02B/7/04 |

* cited by examiner

Primary Examiner—Ricky Mack
(74) Attorney, Agent, or Firm—Wells St. John P.S.

(57) ABSTRACT

The invention relates to a securing arrangement for a mount of an optical element, in particular in a lens systems for semi-conductor lithography, on a component. The mount is mounted, via three bearing bodies, in corresponding bearing locations of the component in each case. The mount and the component are held together via magnetic forces. The magnetic flux in the component (1) is obstructed in the region of the bearing locations (2) by a section (5) of relatively low permeability and can be short-circuited via the bearing bodies (8), made of magnetically highly permeable material, upon connection of the mount (7) and component (1) by at least one magnet.

20 Claims, 2 Drawing Sheets

ARRANGEMENT FOR SECURING A MOUNT OF AN OPTICAL ELEMENT

CROSS REFERENCE TO RELATED APPLICATION

This application relates to and claims priority to corresponding Germany Patent Application No. 101 56 884.3, which was filed on Nov. 20, 2001, and which is incorporated by reference herein.

BACKGROUND OF THE INVENTION

1. Field of the Invention

The invention relates to a securing arrangement for a mount of an optical element, in particular in a lens systems for semiconductor lithography, on a component, the mount being mounted, by at least three bearing bodies in corresponding bearing locations of the component, and the mount and the component being held together via magnetic forces.

2. Description of the Related Art

Reproducible interfaces or arrangements for retaining optical elements which can be exchanged in a reproducible manner, and in the case of which statically determined mounting is used, are known from practice, use being made, inter alia, of the following principles: "three balls-three V-grooves", "three balls-six cylinders" or "three balls-cone-groove-plane". These statically determined mountings allow one element to be accommodated in the other element in a reproducible manner. In stationary applications, in the simplest scenario, it is possible to use the weight of the part which is to be mounted in order to ensure the contact of the contact surfaces. If this is not possible in design terms, for example since installation has to take place from beneath, or if it is possible for relatively high forces which are not oriented in the same direction as the weight (e.g. during transportation or as a result of dynamic excitation) to occur, then an additional exterior retaining force which prevents the contact surfaces from being raised is necessary. It is usually the case that screw, clamping or spring connections and the like are used for this purpose. It is also possible to use magnets which connect the mount to the higher-level system, e.g. a housing of a lens system in semiconductor lithography.

It is usually the case, however, that moments are transmitted to the mount of the optical element by the design-induced position of the force-producing elements or by production tolerances, at the force-introduction locations. These moments then, in certain circumstances, result in disadvantageous deformation, both of the mount and of the optical element connected to it.

Moreover, there is also considerable outlay if the connection has to be released. It is also then the case that the reproducibility of the latter is no longer ensured with the necessary precision since, when the connection is joined together again, the optical element may be subjected to other types of moments which adversely effect the imaging quality thereof.

For the specific purpose of using the arrangement for securing the optical element as an end plate for a lens system in semiconductor lithography, reference should be made to EP 0 724 199 B1 and U.S. Pat. No. 5,973,863. These disclose different applications which are likewise concerned with exchangeable end plates. The two documents bring to light the problem that such plates, if they have to be exchangeable, should allow for the necessity of very precise positioning and of very straightforward and quick exchange.

SUMMARY OF THE INVENTION

The object of the present invention is thus to provide an arrangement for retaining an optical element, of the type mentioned in the introduction, which can be exchanged in a reproducible manner and has a retaining force which differs from the weight and is intended for fixing the elements without the optical element being subjected to deformation.

This object is achieved by an arrangement wherein the magnetic flux in said component is obstructed in the region of the bearing locations by a section of relatively low permeability, whereby the magnetic flux via said bearing bodies, made of magnetically highly permeable material, upon connection of said mount and component can be short-circuited by at least one magnet.

These features make it possible, in a straightforward and advantageous manner, for the mount and component to be connected firmly by the bearing bodies of the mount being introduced into the bearing locations of the component and being held together firmly by the magnetic field produced by short-circuiting. It is also advantageous that it is possible to dispense with screw, clamping or spring connections during the production.

A particularly advantageous development of the invention is that the bearing locations and the bearing bodies are designed such that merely normal forces occur between the bearing locations and the bearing bodies.

Since merely normal forces occur between the bearing locations and the bearing bodies upon connection of the mount and component, global deformation of the interface parts is advantageously avoided. Accordingly, the mount of the optical element is not subjected, at the force-introduction locations, to any disruptive moments which could result in deformation of the mount and thus of the optical element.

According to the invention, it may further be provided that the component is formed from three magnetically conducting segments which are separated by the bearing locations, a material with a considerably lower magnetic permeability being provided in the region of the bearing locations than elsewhere in the segments.

These features easily make it possible for a magnetic flux to run from a magnetic north pole via the first segment, via the first bearing body introduced into the first bearing location, to the second segment, via the second bearing body introduced into the second bearing location, to the third segment and, from there, via the third bearing body introduced into the third bearing location, to the magnetic south pole.

By virtue of the resulting magnetic flux, the bearing bodies are connected firmly to the bearing locations by magnetic forces.

It is advantageous if at least one of the segments has a separation, a material of low magnetic permeability being introduced into the resulting interspace, and it being possible, by means of said material, for a magnetic field to be coupled in by the magnet which bridges the separation.

It is thus easily possible for the bearing bodies to be connected, firmly to the bearing locations by virtue of the magnetic field being coupled in, and they can be raised off from one another in a force-free manner by virtue of the magnetic field being coupled out. Installation expediently takes place here with the magnetic field coupled out. It is only when the defined position of the mount in the component has been reached that the magnetic field is coupled in.

In one configuration, it may further be provided that the separation has an opening for accommodating the magnet.

This feature easily makes it possible to introduce a magnet into the component, it being possible for the magnetic field to be coupled in or switched by said magnet.

In a development of the invention, it may be provided that the poles of the magnet can be adjusted mechanically in relation to the separation of adjacent segments such that the magnetic field can be switched, and that the magnet is designed as a cylindrical permanent magnet.

These features make it possible for the magnetic field to be easily switched on and off manually or mechanically by virtue of the poles being adjusted. A cylindrical permanent magnet may be introduced into a cylindrical opening and can be adjusted by straightforward rotation.

It is advantageous if the magnet is designed as a solenoid.

This embodiment makes it possible for the magnetic field to be switched electrically without being subjected to mechanical or manual action.

Alternatively, it is also possible for the magnet to be designed as a permanent magnet which can be switched off by an electric counter-magnet.

According to the invention, it may further be provided that the bearing locations and the bearing bodies each have a hard surface at least in the contact regions.

These features additionally avoid deformation in the contact regions and ensure that normal forces act at the force-introduction locations.

It is advantageous if the bearing locations have grooves.

With the grooves it is possible for the bearing bodies to be introduced in a straightforward and advantageous manner into the groove-containing bearing locations.

According to the invention, it may further be provided that the grooves each have a V-shape.

The V-shape serves to provide normal forces in the case of, for example, spherical bearing bodies being mounted in the V-shaped grooves of the bearing location. The V-shape of the grooves results in a geometrically optimized arrangement of the magnetic lines of force in this region.

It is advantageous if the hard surface of the bearing locations are formed by hard-metal rollers or by hard-metal plates or by virtue of being nickel plated or hard-chrome plated.

By virtue of these embodiments, it is straightforwardly possible, in production terms, to provide a large number of different kinds of bearing locations with hard surfaces to avoid deformation, depending on requirements.

In a development of the invention, it may be provided that the bearing bodies are of spherical design at least in the region of the contact surfaces, and that the bearing bodies are designed as balls or rollers.

These features make it possible, for example in combination with a V-shaped design of the grooves of the bearing locations, to ensure that normal forces act particularly precisely at the force-introduction locations of the bearing locations and bearing bodies, and thus to prevent deformation of the carrying element and of the optical element. The normal forces each act only at a point, in the case of a spherical bearing body, or only on a straight line, in the case of a roller-like bearing body.

Exemplary embodiments of the invention are illustrated in principle hereinbelow with reference to the drawing, in which:

BRIEF DESCRIPTION OF THE DRAWINGS

FIG. 3a shows a view of part of a component according to the invention with the magnetic field coupled in;

DETAILED DESCRIPTION

Figure 1:
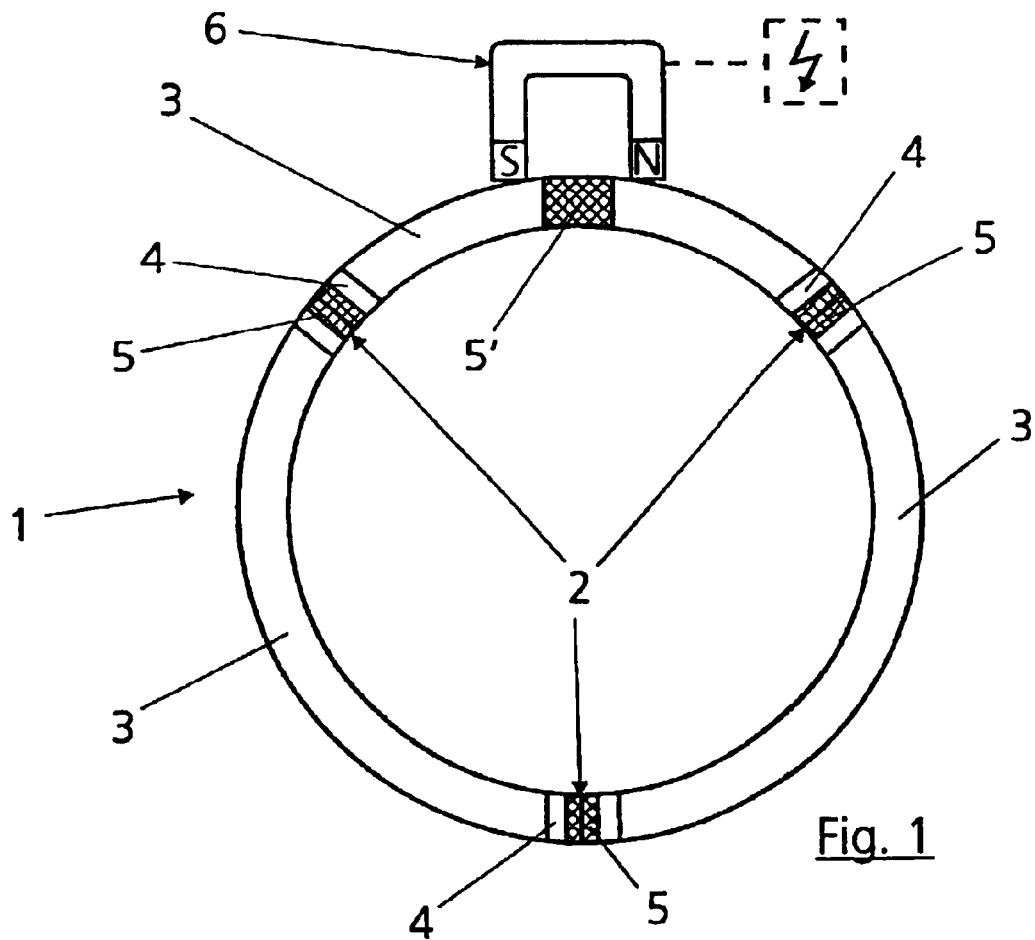
FIG. 1 shows a plan view of an annular component according to the invention from above.

As can be seen from FIG. 1, a component 1 is subdivided, by three bearing locations 2, into three magnetically conducting segments 3 made of steel. The bearing locations 2 have V-shaped grooves 4 with non-conductive material (e.g. hard solder). The magnetic flux is obstructed in the component 1 in the region of the bearing locations 2 by a section 5 of relatively low permeability. The component 1 is generally part of a housing 10 of a lens system for semiconductor lithography (indicated by dashed lines in FIG. 2) or it is correspondingly connected to the housing.

As can further be seen from FIG. 1, one of the segments 3 has a separation 5' in the form of a gap, a material of low magnetic permeability being introduced into the resulting interspace. Magnetic coupling can take place there by way of a magnet 6, which in this case is u-shaped by way of example. It would likewise be conceivable to use a solenoid (illustrated by dashed lines).

Figure 2:
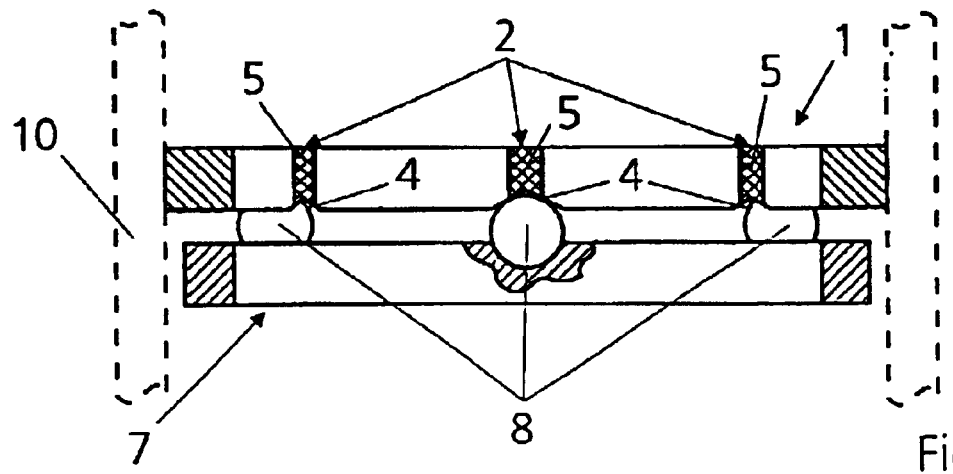
FIG. 2 shows a cross section through the connection according to the invention between the component and mount.

FIG. 2 shows a connection between an annular component 1 and an annular mount 7 with ferromagnetic spherical bearing bodies 8 made of steel adhesively bonded therein. At the bearing locations 2, the component 1 has three V-shaped grooves 4 with hard solder, into which the spherical bearing bodies 8 of the annular mount 7 are introduced. The mount 7 and the component 1 are held together via magnetic forces. The magnetic flux is produced by short-circuiting via the spherical ferromagnetic bearing bodies 8 upon connection of the mount 7 and component 1. Prior to the connection, the magnetic flux is obstructed in the region of the bearing locations 2 by the hard-solder-containing V-grooves 4 with sections 5 of low permeability. The annular mount 7 is accommodated in the lens system for semiconductor lithography, said lens system only being illustrated by dashed lines in FIG. 2.

Figure 3A:
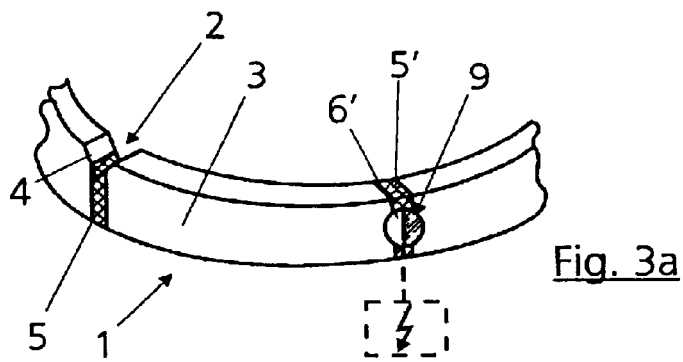

FIG. 3a shows a side view of the component 1 illustrated in FIGS. 1 and 2, it being the case here that a cylindrical permanent magnet 6' has been introduced into a free space or an opening 9 of the separation 5' with the material of low magnetic permeability, the different poles of the permanent magnet 6' being indicated in the figure by hatching/no hatching. In the present exemplary embodiment, the cylindrical permanent magnet 6' can be adjusted mechanically such that the magnetic field can be switched. As can be seen from FIG. 3a, the magnetic field has been switched on.

Figure 3B:
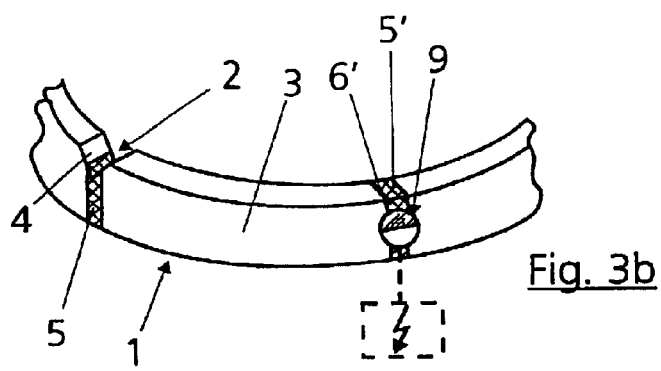
FIG. 3b shows a view of part of a component according to the invention with the magnetic field coupled out.

FIG. 3b shows the same arrangement as FIG. 3a, the difference being that the cylindrical permanent magnet 6' has been moved into the off position by a quarter-turn, and the magnetic field has been short-circuited and does not produce any magnetic flux along the component 1. In a further exemplary embodiment, instead of the permanent magnet 6', it would also be possible to provide a solenoid of different form (illustrated by dashed lines). In this case, the magnetic field could be switched on/off by electric current.

Figure 4:
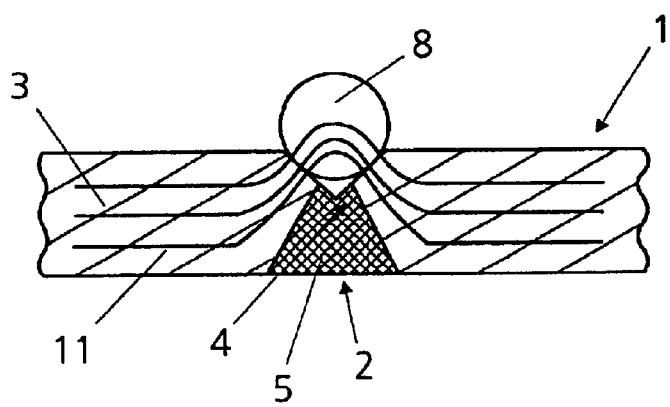
FIG. 4 shows a simplified side view of a component according to the invention in the groove region with a spherical bearing body mounted in the V-shaped groove and with the profile of the magnetic lines of force illustrated in principle.

FIG. 4 shows a spherical bearing body 8, the connection between the latter and the annular mount 7 not being illustrated specifically, which is inserted into the V-shaped groove 4 of the bearing location 2 of the component 1 such that only normal forces occur at the respective points of contact for securing purposes. The magnetic lines of force 11 over the bearing bodies, said lines of force being produced by the non-magnetically conducting V-shaped grooves 4, are illustrated in principle. They also describe the approximate direction of the retaining forces which occur. The bearing locations 2 and the bearing bodies 8 have a hard surface at least in the contact regions. This hard surface may also be produced by nickel plating or hard-chrome plating. The bearing bodies 8 are of spherical design at least in the region of the contact surfaces. The bearing bodies may be designed as balls or rollers 8.

Figure 5:
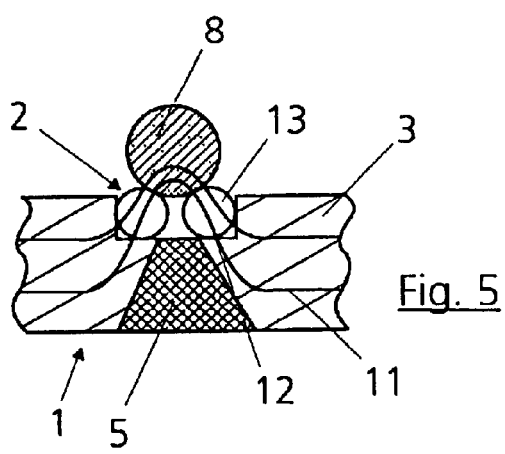
FIG. 5 shows a simplified side view of the component according to the invention with a groove in the form of a rectangular cutout and with hard-metal rollers.

As can be seen from FIG. 5, the component 1, in the case of this exemplary embodiment, has a bearing location 2 with a groove in the form of a rectangular cut-out 12 into which, for the purpose of producing a hard surface, hard-metal rollers 13 have been introduced, the latter being connected to the spherical bearing bodies 8. The hatching of the bearing body 8 here is intended to symbolize a nickel-plated or hard-chrome-plated surface. Furthermore, the resulting magnetic lines of force 11 have also been depicted again here.

Figure 6:
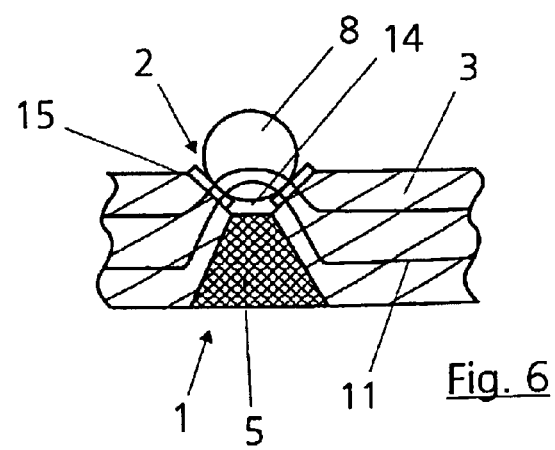
FIG. 6 shows a simplified side view of the component according to the invention with a groove in the form of a trapezoidal cutout and with hard-metal plates.

As can be seen from FIG. 6, a groove in the form of a trapezoidal cutout 14 is made in the bearing location 2 of the component 1, and is provided with hard-metal plates 15 for producing a hard surface. It is also the case here that the spherical bearing body 8 is connected to the bearing location 2 and/or the segment parts 3, which are separated from one another by the separation 5'. As was also the case in FIG. 5, the profile of the magnetic lines of force 11 are illustrated in principle here.

The different configurations of the groove region illustrated in FIGS. 4, 5 and 6 in particular make it possible to achieve more precise and optimized force effects and thus to avoid the mount of the optical element being subjected to moments.

What is claimed is:

1. A securing arrangement for a mount of an optical element, on a component, the mount being mounted, by at least three bearing bodies in corresponding bearing locations of said component, and said mount and said component being held together via magnetic forces, wherein the magnetic flux in said component is obstructed in the region of the bearing locations wherein the magnetic flux via said bearing bodies, made of magnetically highly permeable material, upon connection of said mount and component is short-circuited by at least one magnet that magnetizes the component.

2. The arrangement as claimed in claim 1, wherein said mount is a mount in a lens system for semiconductor lithography.

3. The arrangement as claimed in claim 1, wherein said bearing locations and said bearing bodies are designed such that merely normal forces occur between said bearing locations and said bearing bodies.

4. The arrangement as claimed in claim 1, wherein said component is formed from at least three magnetically conductive segments which are separated by said bearing locations, a material with considerably lower magnetic permeability being provided in the region of said bearing locations than elsewhere in the segments.

5. The arrangement as claimed in claim 4, wherein at least one of said segments has a separation, a material of low magnetic permeability being introduced into the resulting interspace, and by means of said material, for a magnetic field to be coupled in by said magnet which bridges the separation.

6. The arrangement as claimed in claim 5, wherein said separation has an opening for accommodating the magnet.

7. The arrangement as claimed in claim 6, wherein the poles of the magnet can be adjusted mechanically in relation to the separation of adjacent segments such that the magnetic field can be switched.

8. The arrangement as claimed in claim 6, wherein said magnet is designed as a cylindrical permanent magnet.

9. The arrangement as claimed in claim 6, wherein said magnet is designed as a solenoid.

10. The arrangement as claimed in claim 1, wherein said bearing locations and said bearing bodies each have a hard surface at least in the contact regions.

11. The arrangement as claimed in claim 10, wherein said bearing locations have grooves.

12. The arrangement as claimed in claim 11, wherein said grooves each have a V-shape.

13. The arrangement as claimed in claim 11, wherein the hard surface of said bearing locations is formed by hard-metal rollers or by hard-metal plates or by virtue of said grooves being nickel plated or hard-chrome plated.

14. The arrangement as claimed in claim 1, wherein said bearing bodies are of spherical design at least in the region of the contact surfaces.

15. The arrangement as claimed in claim 14, wherein said bearing bodies are designed as balls or rollers.

16. A method for securing a mount of an optical element to a component of an optical system, comprising:

providing a component comprising a magnetically conductive section having at least two separated ends, the component further comprising at least one magnetically non-conductive section connecting the at least two separated ends;

providing a mount comprising a plurality of supports for abutment against the component, at least one support comprising magnetically conductive material;

positioning the plurality of the supports against the component with the magnetically conductive support over the magnetically non-conductive section of the component, the magnetically conductive support contacting the two separated ends to bridge a continuous path for magnetic energy through the component and the magnetically conductive support of the mount; and magnetizing the component to hold the mount against the component.

17. The method of claim 16 wherein the magnetizing comprises providing a magnet outside the component with respective magnetic poles adjacent opposites sides of the magnetically non-conductive section to establish a flow of magnetic energy through the continuous path.

18. The method of claim 16 wherein the magnetizing comprises providing a cylindrical permanent magnet within the magnetically non-conductive section, and further comprising rotating the cylindrical permanent magnet to orient respective magnetic poles which establishes a flow of magnetic energy through the continuous path.

19. The method of claim 16 wherein the magnetically non-conductive section comprises a portion of a V-shaped groove with an upper portion the V-shaped groove formed by respective segments the two separated ends of the magnetically conductive section, and wherein the magnetically conductive support comprises a spherical bearing to be positioned in the V-shaped groove for contact with at least the respective segments the two separated ends.

20. The method of claim 16 wherein:

the component comprises a plurality of magnetically conductive sections, each magnetically conductive section is connected to an adjacent magnetically conductive section by a magnetically non-conductive section;

the plurality of supports comprises magnetically conductive material and each respective one corresponds to a respective one of the magnetically non-conductive sections; and the positioning comprises each respective one of the plurality of supports is provided over the respective one of the magnetically non-conductive sections to contact the respective adjacent two magnetically conductive sections to bridge a continuous path for magnetic energy through the component and the respective magnetically conductive supports of the mount.

* * * * *